United States Patent
Shibata

(10) Patent No.: US 11,251,449 B2
(45) Date of Patent: Feb. 15, 2022

(54) REDOX FLOW BATTERY SYSTEM

(71) Applicant: SUMITOMO ELECTRIC INDUSTRIES, LTD., Osaka (JP)

(72) Inventor: Toshikazu Shibata, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/254,645

(22) PCT Filed: Jun. 26, 2019

(86) PCT No.: PCT/JP2019/025503
§ 371 (c)(1),
(2) Date: Dec. 21, 2020

(87) PCT Pub. No.: WO2020/026655
PCT Pub. Date: Feb. 6, 2020

(65) Prior Publication Data
US 2021/0151782 A1    May 20, 2021

(30) Foreign Application Priority Data

Jul. 30, 2018  (JP) .............................. JP2018-142951

(51) Int. Cl.
*H01M 8/04537* (2016.01)
*H01M 8/04186* (2016.01)
(Continued)

(52) U.S. Cl.
CPC ... *H01M 8/04611* (2013.01); *H01M 8/04186* (2013.01); *H01M 8/04201* (2013.01);
(Continued)

(58) Field of Classification Search
CPC ......... H01M 8/04186; H01M 8/04201; H01M 8/04276; H01M 8/04567; H01M 8/04582;
(Continued)

(56) References Cited

U.S. PATENT DOCUMENTS

2005/0164075 A1* 7/2005 Kumamoto ......... H01M 8/2455
429/50
2013/0084506 A1* 4/2013 Chang ................... H02J 7/0042
429/400
(Continued)

FOREIGN PATENT DOCUMENTS

JP    2003-173812 A    6/2003
JP    2003-317788 A    11/2003
(Continued)

*Primary Examiner* — Brittany L Raymond
(74) *Attorney, Agent, or Firm* — Oliff PLC

(57) ABSTRACT

A redox flow battery system including a cell and a monitor cell to which a same electrolyte solution is supplied; a current measuring unit that measures a current that is input to and output from the cell; a voltage measuring unit that measures an open circuit voltage of the monitor cell; and a computing unit. The computing unit includes a first processing unit, a second processing unit, and a third processing unit. The first processing unit computes an integral value obtained by integrating a current value measured by the current measuring unit, for an amount of time corresponding to a predetermined time constant. The second processing unit computes a corrected voltage value based on a measured voltage value measured by the voltage measuring unit and the integral value. And the third processing unit calculates a first state-of-charge value of the electrolyte solution from the corrected voltage value.

15 Claims, 5 Drawing Sheets

(51) Int. Cl.
*H01M 8/04082* (2016.01)
*H01M 8/04746* (2016.01)
*H01M 8/18* (2006.01)

(52) U.S. Cl.
CPC ... *H01M 8/04567* (2013.01); *H01M 8/04597* (2013.01); *H01M 8/04753* (2013.01); *H01M 8/188* (2013.01)

(58) Field of Classification Search
CPC ......... H01M 8/04597; H01M 8/04611; H01M 8/04641; H01M 8/04753; H01M 8/188; Y02E 60/50
See application file for complete search history.

(56) References Cited

U.S. PATENT DOCUMENTS

| | | | | |
|---|---|---|---|---|
| 2014/0272653 | A1* | 9/2014 | Chaturvedi | H01M 8/04582 429/431 |
| 2019/0020045 | A1* | 1/2019 | Kim | H01M 8/04649 |
| 2019/0036356 | A1* | 1/2019 | Subbaraman | H02J 7/0021 |
| 2019/0165384 | A1* | 5/2019 | Naitou | H01M 8/04194 |

FOREIGN PATENT DOCUMENTS

| | | | |
|---|---|---|---|
| JP | 2013-037857 | * | 2/2013 |
| JP | 2013-37857 A | | 2/2013 |
| JP | 2014-514704 A | | 6/2014 |
| WO | 2012/135473 A2 | | 10/2012 |
| WO | WO 2012-135473 | * | 10/2012 |
| WO | 2018/003554 A1 | | 1/2018 |

* cited by examiner

REDOX FLOW BATTERY SYSTEM

TECHNICAL FIELD

The present disclosure relates to a redox flow battery system.

The present application claims priority based on Japanese Patent Application No. 2018-142951 filed on Jul. 30, 2018, the entire contents of which are incorporated herein by reference.

BACKGROUND ART

Redox flow batteries include a cell (main cell) that performs charging and discharging, and a tank that stores an electrolyte solution. The redox flow batteries circulate the electrolyte solution between the tank and the cell to supply the electrolyte solution to the cell, thereby performing charging and discharging through a change in the valence of metal ions contained in the electrolyte solution. As the electrolyte solution, typically, an aqueous solution is used that contains, as an active material, metal ions (e.g., vanadium ions, etc.) whose valence changes through oxidation reduction.

Some redox flow batteries include a monitoring auxiliary cell (monitor cell) for measuring a state of charge (SOC) of an electrolyte solution, in addition to a main cell that is connected to a power conditioning system and performs charging and discharging (see Patent Documents 1 and 2, for example). The monitor cell is not connected to the power conditioning system, and an electrolyte solution that is the same as that for the main cell is supplied thereto. When such a monitor cell is included, the open circuit voltage (electromotive force) of the monitor cell is measured. Accordingly, it is possible to measure the state of charge of the electrolyte solution supplied to the main cell, by measuring the potential difference of the electrolyte solution. The reason for this is that, as shown in FIG. 3, there is a correlation between the open circuit voltage of the monitor cell (hereinafter, it may be referred to as a monitor cell voltage) and the state of charge (SOC) of the electrolyte solution, and the state of charge can be obtained from the monitor cell voltage. In FIG. 3, the horizontal axis indicates the state of charge (SOC [%]). In FIG. 3, the vertical axis indicates the monitor cell voltage [V].

CITATION LIST

Patent Documents

Patent Document 1: JP 2003-317788A
Patent Document 2: JP 2013-37857A

SUMMARY OF INVENTION

The present disclosure is directed to a redox flow battery system including:

a cell that performs charging and discharging through supply of an electrolyte solution;

a monitor cell to which an electrolyte solution that is the same as the electrolyte solution is supplied;

a current measuring unit that measures a current that is input to and output from the cell;

a voltage measuring unit that measures an open circuit voltage of the monitor cell; and a computing unit that computes a state of charge of the electrolyte solution, wherein the computing unit includes a first processing unit, a second processing unit, and a third processing unit, the first processing unit computes an integral value obtained by integrating a current value measured by the current measuring unit, for an amount of time corresponding to a predetermined time constant, the second processing unit computes a corrected voltage value based on a measured voltage value measured by the voltage measuring unit and the integral value, and the third processing unit calculates a first state-of-charge value of the electrolyte solution from the corrected voltage value.

DESCRIPTION OF EMBODIMENTS

Problem to be Solved by the Present Disclosure

Figure 3:
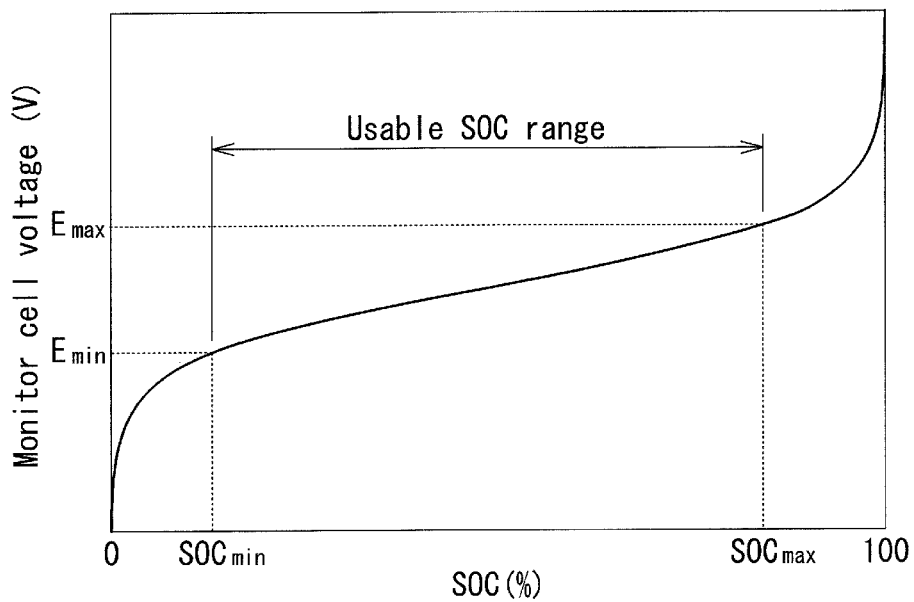
FIG. 3 is a graph showing an example of a relationship between the monitor cell voltage and the state of charge (SOC) of an electrolyte solution.

Conventionally, in a redox flow battery system, the charging and discharging of a cell is controlled based on a state of charge of an electrolyte solution. Typically, the state of charge of the electrolyte solution in such a redox flow battery system is managed by measuring an open circuit voltage of the monitor cell, and obtaining the state of charge of the electrolyte solution from the measured value. The monitor cell voltage and the state of charge of the electrolyte solution have a relationship as shown in FIG. 3, where the higher the state of charge (SOC) is, the higher the monitor cell voltage is. As shown in FIG. 3, in the ranges in which the state of charge (SOC) is close to 0% and is close to 100%, the inclination (change rate) of the monitor cell voltage relative to the state of charge is large. Furthermore, in the intermediate range between the ranges in which the state of charge is low and is high, the inclination of the monitor cell voltage is substantially constant, and the monitor cell voltage linearly changes relative to the state of charge. Typically, the redox flow battery system is controlled within the range of the state of charge in which the inclination of the monitor cell voltage is substantially constant. For example, the redox flow battery system is used such that the state of charge of the electrolyte solution is within a range of 15 to 85%. Hereinafter, the range of the state of charge of the electrolyte solution that is be used may be referred to as a usable state-of-charge range. In FIG. 3, $SOC_{min}$ and $SOC_{max}$ respectively indicate the minimum value (the lower limit value) and the maximum value (the upper limit value) of the usable state-of-charge range (usable SOC range). Furthermore, $E_{min}$ and $E_{max}$ respectively indicate the monitor cell voltages when the state of charge is $SOC_{min}$ and $SOC_{max}$. $E_{max}$ indicates the maximum value of the monitor cell voltage, and $E_{min}$ indicates the minimum value of the monitor cell voltage.

Such a redox flow battery system is problematic in that there is a time delay in a voltage change in the monitor cell from charging or discharging of the cell. Accordingly, it is difficult to properly see the state of charge of the electrolyte solution in the entire redox flow battery system.

The redox flow battery system includes a circulation path through which an electrolyte solution circulates between the tank and the cell. The electrolyte solution is sent from the tank through the circulation path to the cell, is charged or discharged in the cell, and is then returned to the tank. The electrolyte solution returned to the tank is again sent from the tank through the circulation path to the cell. That is to say, it takes time from when an electrolyte solution is supplied to the cell and is charged or discharged in the cell to when the charged or discharged electrolyte solution is again supplied to the cell. Accordingly, if the monitor cell measures the state of charge of the electrolyte solution, there is a time delay until the state of charge of the electrolyte solution charged or discharged in the cell is reflected in the voltage of the monitor cell. Thus, there is a time delay in a voltage change in the monitor cell from charging or discharging of the cell.

If the redox flow battery system is used to smooth the output of natural energy generation such as solar photovoltaic power generation or wind power generation, charging and discharging are switched in units of several seconds. In conventional redox flow battery systems, the state of charge of an electrolyte solution sent to the cell is measured by the monitor cell. However, as described above, there is a time delay in a voltage change in the monitor cell from charging or discharging, and thus it is not possible to predict the state of charge of the electrolyte solution that will be sent to the cell after several seconds or several tens of seconds. Accordingly, in the case of controlling charging and discharging in units of several seconds, it is difficult to manage the state of charge of the electrolyte solution within the usable range. Thus, it is required to see the state of charge of the electrolyte solution in the entire system including the circulation path and the tank.

It is an object of the present disclosure to provide a redox flow battery system in which it is possible to see the state of charge of an electrolyte solution in the entire system.

Advantageous Effects of the Present Disclosure

According to the redox flow battery system of the present disclosure, it is possible to see the state of charge of an electrolyte solution in the entire system.

Description of Embodiments of the Present Disclosure

The following factors seem to cause a time delay in a voltage change in the monitor cell.
(1) Time necessary for an electrolyte solution to pass through a cell (including a monitor cell) to replace the electrolyte solution in the cell
(2) Time necessary for an electrolyte solution to pass through a circulation path
(3) Time necessary for an electrolyte solution returned to a tank to be diffused in the electrolyte solution in the tank The delay time (the time constant) of a voltage change in the monitor cell is determined by the configuration or the operation conditions of the redox flow battery, specifically, the size of the cell, the length or the diameter of the circulation path, the capacity of the tank, the flow rate of the pump, and the like, but it is typically several minutes or more (e.g., 6 minutes or more).

The present inventor conducted an in-depth study on redox flow battery systems including monitor cells in consideration of the above-described factors, and obtained the following findings. That is to say, a voltage value (a measured voltage value) measured by a voltage measuring unit that measures an open circuit voltage of a monitor cell is corrected based on the delay time (the time constant) of a voltage change in the monitor cell. It is possible to properly see the state of charge of an electrolyte solution in the entire system, by obtaining the state of charge of the electrolyte solution from the corrected voltage value obtained through the correction. The state of charge of the electrolyte solution is proportional to the amount of electric charge (an integral value of a current) that flows through the cell through charging or discharging. Thus, it is possible to correct the time delay in the monitor cell voltage from charging or discharging, by adding an integral value of a current that flowed through the cell from a current point in time to a point that is earlier by the delay time (an amount of time corresponding to a time constant) to the measured voltage value of the monitor cell. Furthermore, it is possible to see the state of charge of the electrolyte solution in the entire system, by calculating the state of charge of the electrolyte solution from the corrected voltage value of the monitor cell obtained through the correction. In the description below, a value of the state of charge of the electrolyte solution calculated from the corrected voltage value is referred to as a first state-of-charge value of the electrolyte solution. First, embodiments of the present disclosure will be listed and described.

(1) An embodiment of the present disclosure is directed to a redox flow battery system, including:
a cell that performs charging and discharging through supply of an electrolyte solution;
a monitor cell to which an electrolyte solution that is the same as the electrolyte solution is supplied;
a current measuring unit that measures a current that is input to and output from the cell;
a voltage measuring unit that measures an open circuit voltage of the monitor cell; and
a computing unit that computes a state of charge of the electrolyte solution,
wherein the computing unit includes a first processing unit, a second processing unit, and a third processing unit,
the first processing unit computes an integral value obtained by integrating a current value measured by the current measuring unit, for an amount of time corresponding to a predetermined time constant,
the second processing unit computes a corrected voltage value based on a measured voltage value measured by the voltage measuring unit and the integral value, and
the third processing unit calculates a first state-of-charge value of the electrolyte solution from the corrected voltage value.

With this redox flow battery system, it is possible to see the state of charge of the electrolyte solution in the entire system in real-time, by causing the computing unit (the first processing unit, the second processing unit, and the third processing unit) to compute the state of charge of the electrolyte solution. The computing unit integrates a current value measured by the current measuring unit, with a time constant, and corrects a measured voltage value measured by the voltage measuring unit based on the integral value of the current, thereby correcting the time delay in the monitor cell voltage from charging or discharging. Specifically, an integral value is computed that is obtained by integrating a current value measured by the current measuring unit, for an amount of time corresponding to a time constant, and a corrected voltage value is computed based on the measured voltage value and the integral value. The time constant can be determined based on a time delay in a voltage change in the monitor cell. With this redox flow battery system, it is possible to see the state of charge of the electrolyte solution in the entire system in real-time, by causing the computing unit to calculate a state of charge (a first state-of-charge value) of the electrolyte solution from the corrected voltage value.

(2) In the redox flow battery system according to the embodiment, the time constant may be obtained by performing measurement in advance while operating the redox flow battery system.

The time constant is different for each redox flow battery system. According to the embodiment, it is possible to precisely and easily obtain the time constant, by obtaining the time constant by performing measurement while actually operating the redox flow battery system. It is possible to obtain the time constant, by performing a charging or discharging operation and measuring an amount of time taken from when charging or discharging is started to when the monitor cell voltage changes.

(3) In the redox flow battery system according to the embodiment, it is possible that the redox flow battery system further includes:

a circulation path through which the electrolyte solution circulates between a tank that stores the electrolyte solution and the cell;

a pump that is provided on the circulation path, and pumps the electrolyte solution; and a pump controlling unit that controls a flow rate of the pump, wherein the time constant is changed according to the flow rate of the pump.

When the flow rate of the pump changes, the amount of time taken until the electrolyte solution flows through the cell and the circulation path also changes, and thus the time constant changes as well. Thus, it is possible to properly correct the time delay in the monitor cell voltage, by changing the time constant according to the flow rate of the pump. That is to say, it is possible to compute a proper corrected voltage value that conforms to the time delay in the monitor cell voltage. Thus, according to the embodiment, it is possible to more accurately see the state of charge of the electrolyte solution in the entire system, by calculating a state of charge (a first state-of-charge value) of the electrolyte solution from the corrected voltage value.

(4) In the redox flow battery system according to the embodiment, it is possible that the redox flow battery system further includes:

a logging unit that records the first state-of-charge value at constant time intervals.

According to the embodiment, it is possible to record the first state-of-charge value of the electrolyte solution, by providing a logging unit. The first state-of-charge value of the electrolyte solution recorded by the logging unit can be effectively used, for example, for operation analysis and the like of the redox flow battery system.

(5) In the redox flow battery system according to the embodiment, it is possible that the redox flow battery system further includes:

a first determining unit that determines whether or not the first state-of-charge value is within a predetermined range, and emits an abnormality signal upon determining that the value is not within the predetermined range.

According to the embodiment, it is possible to give notice of an abnormality in the state of charge of the electrolyte solution, by causing the first determining unit to emit an abnormality signal upon determining that the first state-of-charge value of the electrolyte solution is not within the predetermined range. According to the embodiment, it is possible to, for example, stop charging or discharging of the cell or alert an operator, in response to an abnormality signal. Specific examples of the predetermined range include the usable state-of-charge range.

(6) In the redox flow battery system according to the embodiment, it is possible that the computing unit includes a fourth processing unit that calculates a second state-of-charge value of the electrolyte solution from a measured voltage value measured by the voltage measuring unit, and the redox flow battery system further includes a second determining unit that determines whether or not the second state-of-charge value is within a predetermined range, and emits an abnormality signal upon determining that the value is not within the predetermined range.

According to the embodiment, it is possible that the computing unit includes a fourth processing unit, and the fourth processing unit calculates a second state-of-charge value from the measured voltage value. The second state-of-charge value is a value obtained by directly calculating the state of charge of the electrolyte solution from the measured voltage value, without using the above-described integral value. According to the embodiment, it is possible to see, in real-time, the state of charge of the electrolyte solution that is sent to the cell, by causing the computing unit to calculate a state of charge (a second state-of-charge value) of the electrolyte solution from the measured voltage value. Moreover, according to the embodiment, it is possible to protect the cell from damage due to overcharge or overdischarge, by causing the second determining unit to emit an abnormality signal upon determining that the second state-of-charge value of the electrolyte solution is not within the predetermined range. According to the embodiment, it is possible to, for example, stop charging or discharging of the cell or alert an operator, in response to an abnormality signal.

(7) In the redox flow battery system according to the embodiment, it is possible that the redox flow battery system further includes:

a power conditioning system that is connected to the cell, wherein the current measuring unit includes a current calculating unit that calculates a current that is input to and output from the cell, from an alternating current value measured by the power conditioning system, a conversion efficiency of the power conditioning system, and a resistance of the cell.

If the current calculating unit calculates a current that is input to and output from the cell, it is not necessary to directly measure a current that flows through the cell, which is effective for the case in which it is difficult to directly measure a current that flows through the cell.

(8) In the redox flow battery system according to the embodiment (7), the resistance of the cell, for use by the current calculating unit, may be changed according to a temperature of the electrolyte solution.

The resistance of the cell changes in accordance with the temperature of the electrolyte solution. Thus, it is possible to precisely calculate the current that is input to and output from the cell, by changing the resistance of the cell, for use by the current calculating unit, according to the temperature of the electrolyte solution.

(9) In the redox flow battery system according to the embodiment (7) or (8), the conversion efficiency of the power conditioning system, for use by the current calculating unit, may be changed according to an operation output of the power conditioning system.

The conversion efficiency of the power conditioning system changes in accordance with the operation output of the power conditioning system. Thus, it is possible to precisely calculate the current that is input to and output from the cell, by changing the conversion efficiency of the power conditioning system, for use by the current calculating unit, according to the operation output of the power conditioning system.

Details of Embodiments of the Present Disclosure

Hereinafter, a specific example of a redox flow battery system according to an embodiment of the present disclosure will be described with reference to the drawings. Hereinafter, a "redox flow battery" may be referred to as an "RF battery". In the drawings, the same reference numerals denote the same constituent elements. The present invention is defined by the terms of the claims, but not limited to the above description, and is intended to include any modifications within the meaning and scope equivalent to the terms of the claims Embodiment 1

Outline of RF Battery System

Figure 1:
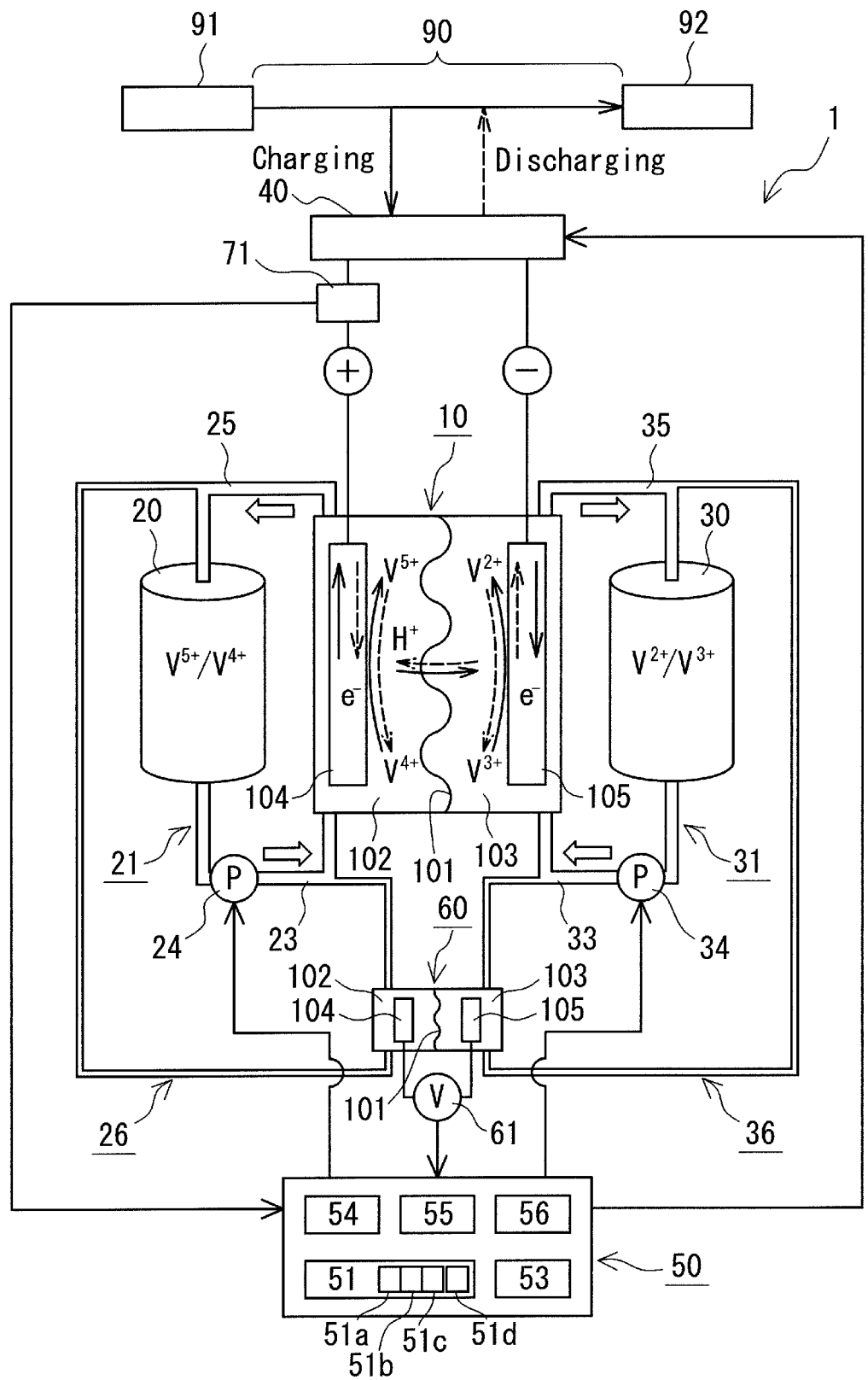
FIG. 1 is a schematic configuration diagram of a redox flow battery system according to Embodiment 1.

Hereinafter, an RF battery system 1 according to Embodiment 1 will be described with reference to FIGS. 1 to 4. As shown in FIG. 1, the RF battery system 1 of Embodiment 1 includes a cell (main cell) 10, tanks 20 and 30, circulation paths 21 and 31, a power conditioning system (PCS) 40, a battery management system (BMS) 50, and a monitor cell 60. The RF battery system 1 is connected via the power conditioning system 40 to a power grid 90, and is a system to which electric power generated by a power generating unit 91 can be charged and from which charged electric power can be discharged to a load 92. The power generating unit 91 is an electric power plant using natural energy through solar photovoltaic power generation, wind power generation, or the like. The RF battery system 1 is typically used to smooth the output of natural energy generation.

One of the characteristics of the RF battery system 1 of Embodiment 1 is that it includes a current measuring unit 71, a voltage measuring unit 61, and a computing unit 51, as shown in FIG. 1. The computing unit 51 includes a first processing unit 51a, a second processing unit 51b, and a third processing unit 51c. The computing unit 51 causes the first processing unit 51a, the second processing unit 51b, and the third processing unit 51c to calculate a state of charge (a first state-of-charge value) of electrolyte solutions from a corrected voltage value. The computing unit 51 will be described later in detail. Hereinafter, the configuration of the RF battery system 1 will be described in detail with reference mainly to FIG. 1.

Cell

A cell 10 is a main cell that performs charging and discharging through the supply of electrolyte solutions. The cell 10 includes a positive electrode 104, a negative electrode 105, and a membrane 101 that is interposed between the electrodes 104 and 105, and a positive electrode cell 102 and a negative electrode cell 103 are formed with the membrane 101 interposed therebetween. The membrane 101 is, for example, an ion exchange membrane that is permeable to hydrogen ions. The positive electrode cell 102 accommodates the positive electrode 104, and the negative electrode cell 103 accommodates the negative electrode 105. Electrolyte solutions (a positive electrolyte solution and a negative electrolyte solution) are supplied to the cell 10 (the positive electrode cell 102 and the negative electrode cell 103). In the RF battery system 1 shown in FIG. 1, the circulation paths 21 and 31 are connected to the cell 10, and the positive electrolyte solution and the negative electrolyte solution respectively circulate through the circulation paths 21 and 31 to the positive electrode cell 102 and the negative electrode cell 103. FIG. 1 shows an example of a vanadium-based RF battery using electrolyte solutions containing vanadium ions. In the cell 10 in FIG. 1, the solid arrows indicate a charge reaction, and the dashed arrows indicate a discharge reaction.

Figure 2:
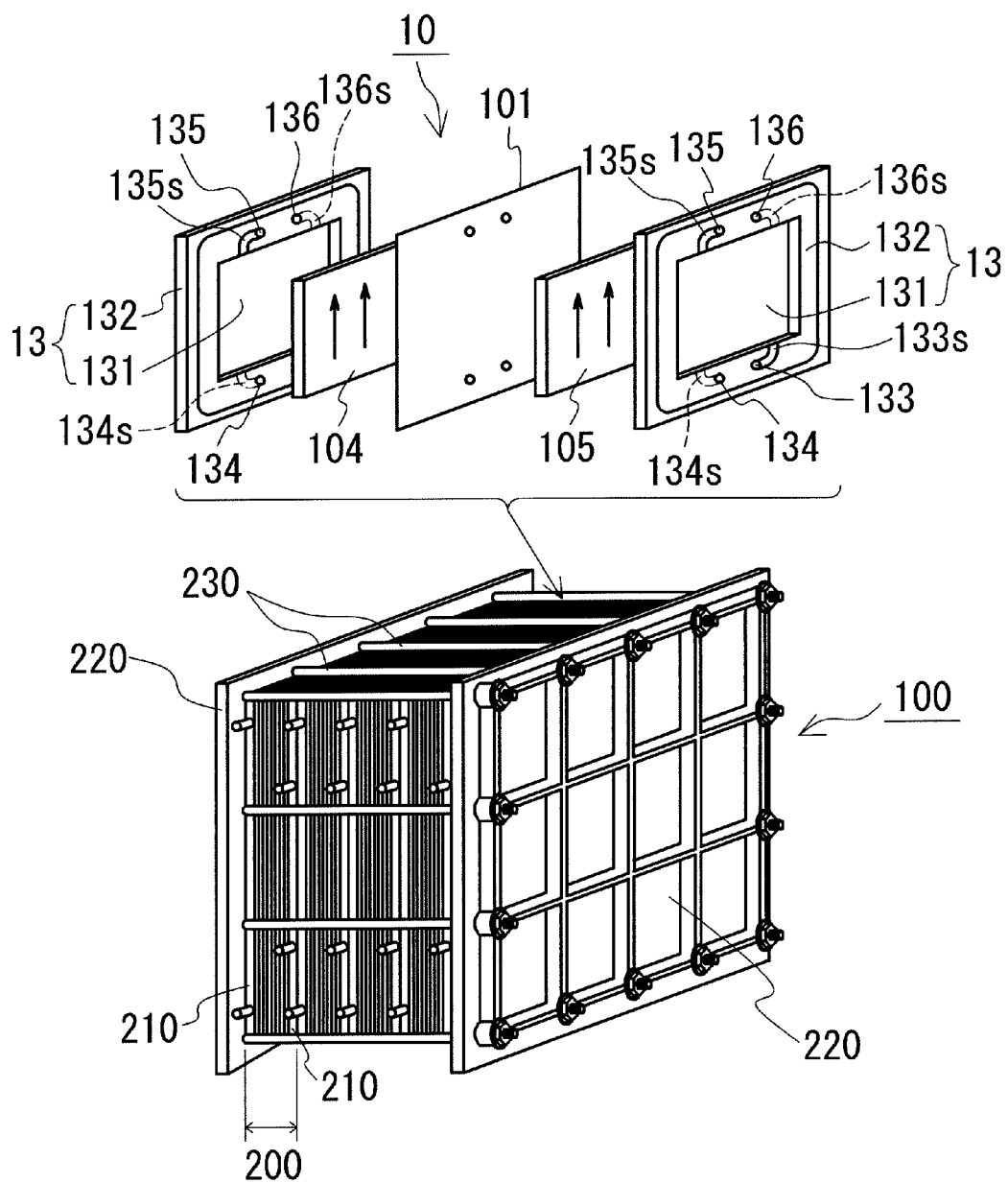
FIG. 2 is a schematic configuration diagram of a cell stack.

The cell 10 may be constituted by a unit cell including a single cell 10, or a multi-cell including a plurality of cells 10. In the case of a multi-cell, a form called a cell stack 100 is employed in which a plurality of cells 10 are stacked as shown in FIG. 2. As shown in the lower diagram in FIG. 2, the cell stack 100 has a configuration in which a sub stack 200 is sandwiched between two end plates 220 from the two sides, and the end plates 220 on the two sides are tightened by a tightening mechanism 230. FIG. 2 shows an example of a form including a plurality of sub stacks 200. As shown in the upper diagram in FIG. 2, each sub stack 200 has a configuration in which a plurality of cell frames 13, positive electrodes 104, membranes 101, and negative electrodes 105 are sequentially stacked, and supply/discharge plates 210 shown in the lower diagram in FIG. 2 are arranged at two ends of the stacked body. Supply pipes 23 and 33 and discharge pipes 25 and 35 of the circulation paths 21 and 31 shown in FIG. 1 are connected to the supply/discharge plates 210. The number of cells 10 stacked in the cell stack 100 can be selected as appropriate.

As shown in the upper diagram in FIG. 2, each cell frame 13 includes a bipolar plate 131 that is arranged between the positive electrode 104 and the negative electrode 105, and a frame member 132 that is located around the bipolar plate 131. The positive electrode 104 is arranged on one face side of the bipolar plate 131. The negative electrode 105 is arranged on the other face side of the bipolar plate 131. The positive electrode 104 and the negative electrode 105 with the bipolar plate 131 interposed therebetween are accommodated inside the frame member 132. Adjacent frame members 132 abut against each other such that one face side of one of the frame members faces the other face side of the other frame member. In the sub stacks 200 (the cell stack 100), the positive electrode 104 and the negative electrode 105 with the membrane 101 interposed therebetween are arranged between the bipolar plates 131 of adjacent cell frames 13, and thus one cell 10 (the positive electrode cell 102 and the negative electrode cell 103) is formed.

As shown in the upper diagram in FIG. 2, supply manifolds 133 and 134, discharge manifolds 135 and 136, supply slits 133s and 134s, and discharge slits 135s and 136s are formed in the frame member 132 of the cell frame 13. In this example, a positive electrolyte solution is supplied from the supply manifold 133 formed in the lower portion of the frame member 132 via the supply slit 133s formed on one face side of the frame member 132 to the positive electrode 104. The positive electrolyte solution supplied to the positive electrode 104 is discharged via the discharge slit 135s formed in the upper portion of the frame member 132 to the discharge manifold 135. In a similar manner, a negative electrolyte solution is supplied from the supply manifold 134 formed in the lower portion of the frame member 132 via the supply slit 134s formed on the other face side of the frame member 132 to the negative electrode 105. The negative electrolyte solution supplied to the negative electrode 105 is discharged via the discharge slit 136s formed in the upper portion of the frame member 132 to the discharge manifold 136. The supply manifolds 133 and 134 and the discharge manifolds 135 and 136 are formed through the frame member 132, and constitute paths of the electrolyte solutions when the cell frames 13 are stacked. The paths are connected via the supply/discharge plates 210 shown in the lower diagram in FIG. 2 respectively to the supply pipes 23 and 33 and the discharge pipes 25 and 35 of the circulation paths 21 and 31 shown in FIG. 1. With these paths, the positive electrolyte solution and the negative electrolyte solution can be allowed to flow through the cells 10 in the cell stack 100.

Tanks

The tanks 20 and 30 respectively store a positive electrolyte solution and a negative electrolyte solution. In FIG. 1, the tank 20 is a positive electrolyte solution tank that stores a positive electrolyte solution. Furthermore, the tank 30 is a negative electrolyte solution tank that stores a negative electrolyte solution. In this example, electrolyte solutions containing vanadium ions are used as positive and negative electrolyte solutions. Other examples of the electrolyte solutions include electrolyte solutions containing manganese ions, or titanium ions, and both manganese ions and titanium ions, and the like.

Circulation Paths

The circulation paths 21 and 31 allow electrolyte solutions to circulate respectively between the tanks 20 and 30 and the cells 10. In FIG. 1, the circulation path 21 is a positive electrode circulation path through which a positive electrolyte solution is allowed to circulate between the tank 20 and the cells 10. Furthermore, the circulation path 31 is a negative electrode circulation path through which a negative electrolyte solution is allowed to circulate between the tank 30 and the cells 10. The circulation paths 21 and 31 include the supply pipes 23 and 33 that send electrolyte solutions from the tanks 20 and 30 to the cells 10, and the discharge pipes 25 and 35 that return the electrolyte solutions from the cells 10 to the tanks 20 and 30. The supply pipes 23 and 33 include pumps 24 and 34 that pump electrolyte solutions. The pumps 24 and 34 are variable pumps in which the number of rotations can be controlled, and the flow rates of the electrolyte solutions can be adjusted with the number of rotations.

The power conditioning system 40 is connected to the cells 10, and charges and discharges the cells 10. The power conditioning system 40 is an AC-DC converter for AC-DC conversion that performs conversion between an alternating current and a direct current between the power grid 90 and the cells 10. The power conditioning system 40 performs AC-DC conversion between the power conditioning system 40 and the power grid 90, and inputs and outputs a current to and from the cells 10, thereby charging and discharging the cells 10. The power conditioning system 40 accommodates an unshown control board in which a CPU (central processing unit) and a memory are mounted. The power conditioning system 40 includes an unshown ammeter and the like for measuring a current that flows through the power conditioning system 40.

The battery management system 50 controls the power conditioning system 40, thereby controlling the charging and discharging of the cells 10. The battery management system 50 controls various units of the RF battery system 1, and is connected to the monitor cell 60, the pumps 24 and 34, and the like, as well as the power conditioning system 40. The battery management system 50 accommodates an unshown control board in which a CPU and a memory are mounted. As the battery management system 50, for example, a computer such as a PLC (programmable logic controller) or a personal computer may be used. In the RF battery system 1 of Embodiment 1, as shown in FIG. 1, the battery management system 50 includes various controlling units such as the computing unit 51, and a pump controlling unit 53 that controls the flow rates of the pumps 24 and 34. The various controlling units are arranged on the control board of the battery management system 50.

Monitor Cell

Electrolyte solutions that are the same as the electrolyte solutions that are to be supplied to the cells 10 are supplied to the monitor cell 60. The monitor cell 60 has a configuration that is similar to that of the cells 10, and is constituted by the positive electrode 104 (the positive electrode cell 102), the negative electrode 105 (the negative electrode cell 103), and the membrane 101. Branch paths 26 and 36 that branch from the circulation paths 21 and 31 are connected to the monitor cell 60 (the positive electrode cell 102 and the negative electrode cell 103), and electrolyte solutions (the positive electrolyte solution and the negative electrolyte solution) that are the same as those for the cells 10 circulate therethrough via the branch paths 26 and 36. The monitor cell 60 is not connected to the power conditioning system 40, and does not perform charging or discharging.

Voltage Measuring Unit

The voltage measuring unit 61 measures the open circuit voltage of the monitor cell 60. If the open circuit voltage (electromotive force) of the monitor cell 60 is measured, the potential difference of the electrolyte solutions can be measured, and thus the state of charge (SOC) of the electrolyte solutions can be obtained. The potential difference of the electrolyte solutions is the potential difference between the positive electrolyte solution and the negative electrolyte solution. The voltage measuring unit 61 shown in FIG. 1 is a voltmeter, and is attached to the monitor cell 60. In this example, the voltage value (measured voltage value) measured by the voltage measuring unit 61 is transmitted to the battery management system 50, and the computing unit 51 computes a state of charge of the electrolyte solutions. In the battery management system 50, a relationship between the monitor cell voltage and the state of charge (SOC) of the electrolyte solution as shown in FIG. 3 is stored in a memory.

Current Measuring Unit

The current measuring unit 71 measures a current that is input to and output from the cells 10. The current measuring unit 71 shown in FIG. 1 is an ammeter. Examples of the ammeter include a direct-current current transformer (DCCT) that detects a direct current, and preferably include a DCCT using a Hall element. In this example, the current value measured by the current measuring unit 71 is transmitted to the battery management system 50.

Computing Unit

The computing unit 51 computes the state of charge (SOC) of the electrolyte solutions. The computing unit 51 includes the first processing unit 51a, the second processing unit 51b, and the third processing unit 51c. In this example, the computing unit 51 further includes a fourth processing unit 51d. The first processing unit 51a computes an integral value obtained by integrating a current value measured by the current measuring unit 71, for an amount of time corresponding to a predetermined time constant. The second processing unit 51b computes a corrected voltage value based on the measured voltage value measured by the voltage measuring unit 61 and the integral value. The third processing unit 51c calculates a state of charge (a first state-of-charge value) of the electrolyte solutions from the corrected voltage value. Meanwhile, the fourth processing unit 51d calculates a state of charge (a second state-of-charge value) of the electrolyte solutions from the measured voltage value. In this example, the computing processing by the computing unit 51 is executed on a processor of a computer.

The computing unit 51 causes the first processing unit 51a to compute an integral value obtained by integrating a current value with a time constant, and the second processing unit 51b to compute a corrected voltage value based on the measured voltage value and the integral value of a current. Specifically, an integral value of a current that is input to and output from the cells 10 for a period of time corresponding to a time constant is added to the measured voltage value of the monitor cell 60, so that the time delay in the monitor cell voltage from charging or discharging is corrected. Through the computing processing, a corrected voltage value of the monitor cell 60 is obtained. An algorithm for computing a corrected voltage value can be expressed in a numerical expression as in Equation 1 below.

$$VMC_a(t) = VMC(t) + \tau n KI(t) \qquad \text{Equation 1}$$

Figure 4:
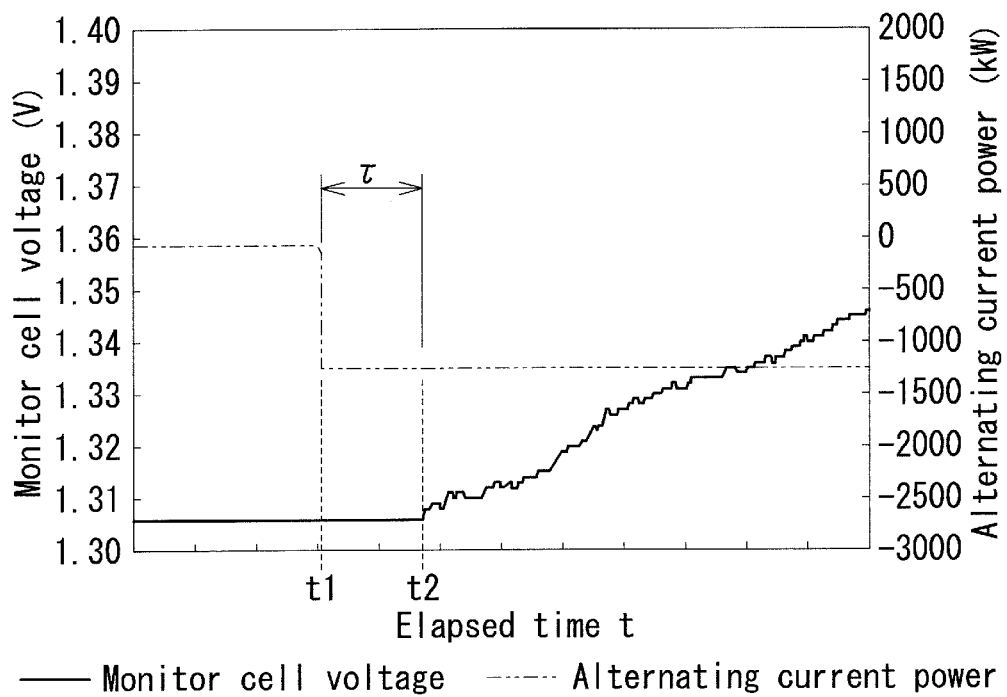
FIG. 4 is a graph showing an example of a change in the monitor cell voltage when a charging operation of the redox flow battery system according to Embodiment 1 is performed.

$VMC_a$ (t): Corrected voltage value [V] of monitor cell 60
VMC (t): Measured voltage value [V] of monitor cell 60
τ: Delay time (time constant) [sec] of voltage change in monitor cell 60
n: Number [cells] of cells 10 in cell stack 100
K: Proportional constant
I(t): Integral value (average value) [A] of current that is input to and output from cells 10 for period of time corresponding to time constant The time constant that is used in the computing unit 51 (the first processing unit 51a) is determined based on a time delay in a voltage change in the monitor cell 60. In this example, the time constant is obtained by performing measurement in advance while operating the RF battery system 1. The time constant can be obtained by performing a charging or discharging operation, and measuring an amount of time taken from when charging or discharging is started to when the monitor cell voltage changes. FIG. 4 shows a change in the monitor cell voltage when a charging operation of the RF battery system 1 is performed. In FIG. 4, the horizontal axis indicates the elapsed time t. In FIG. 4, the left vertical axis indicates the monitor cell voltage, and the right vertical axis indicates the alternating current power that is input and output. A positive alternating current power indicates discharging. A negative alternating current power indicates charging. In FIG. 4, the solid line indicates the monitor cell voltage. In FIG. 4, the two-dot chain line indicates the alternating current power. As shown in FIG. 4, in the RF battery system 1, the monitor cell voltage starts to increase after a certain period of time has elapsed after charging is started. The amount of time taken from a charge start time (t1) to a time (t2) when the monitor cell voltage changes corresponds to a time constant (τ). It is possible to precisely and easily obtain the time constant, by obtaining the time constant by performing measurement while actually operating the RF battery system 1 in this manner. The time constant may be stored in a memory of the battery management system 50.

The integral value (I(t)) of a current that is input to and output from the cells 10 can be obtained by causing the current measuring unit 71 to measure a current (a charging or discharging current) that is input to and output from the cells 10, and integrating the charging or discharging current for an amount of time corresponding to the time constant.

The proportional constant K can be obtained as an amount of change in the monitor cell voltage relative to an accumulated value of a current that is input to and output from the cells 10 through charging or discharging. In the RF battery system 1, the range of the state of charge of the electrolyte solutions that are used is a straight line region in which the inclination of the monitor cell voltage shown in FIG. 3 is substantially constant. The state of charge of the electrolyte solutions can be regarded as being equivalent to the accumulated value of a current. Accordingly, the inclination of the monitor cell voltage in the usable state-of-charge range can be regarded as the change amount. Thus, the proportional constant K can be obtained by calculating the inclination of the monitor cell voltage in the usable state-of-charge range (usable SOC range) from the relationship as shown in FIG. 3 between the monitor cell voltage and the state of charge (SOC). The proportional constant K can be expressed as in Equation 2 below.

$$K = \frac{E_{max} - E_{min}}{Ah \times (SOC_{max} - SOC_{min})} \qquad \text{Equation 2}$$

$E_{max}$: Maximum value [V] of monitor cell voltage
$E_{min}$: Minimum value [V] of monitor cell voltage
$SOC_{max}$: Maximum value [%] of usable state-of-charge range
$SOC_{min}$: Minimum value [%] of usable state-of-charge range
Ah: Total amount [m³] of vanadium ions contained in electrolyte solution In the RF battery system 1, the usable state-of-charge range is predetermined. Accordingly, $SOC_{max}$ and $SOC_{min}$ are set in advance. $E_{max}$ and $E_{min}$ can be obtained by respectively measuring the open circuit voltages of the monitor cell 60 at $SOC_{max}$ and $SOC_{min}$. The proportional constant K may be calculated in advance using Equation 2 and stored in a memory of the battery management system 50.

The total amount of vanadium ions Ah can be obtained using Equation 3.

$$Ah = V \times L \times 1000 \times F \div 3600 \qquad \text{Equation 3}$$

V: Molar concentration [mol/L] of vanadium ions
L: Amount [m³] of electrolyte solution (positive electrolyte solution or negative electrolyte solution)
F: Faraday constant [C/mol]

The computing unit 51 causes the first processing unit 51a and the second processing unit 51b to perform computing processing of Equation 1, and correct the measured voltage value based on the time constant, thereby obtaining a corrected voltage value. Then, the computing unit 51 causes the third processing unit 51c to calculate a state of charge of the electrolyte solutions from the corrected voltage value. Specifically, the third processing unit 51c obtains the state of charge when the monitor cell voltage is at the corrected voltage value, with reference to the above-described relationship between the monitor cell voltage and the state of charge (SOC) stored in the memory. The state-of-charge value calculated by the third processing unit 51c from the corrected voltage value is referred to as a first state-of-charge value. Moreover, the computing unit 51 causes the fourth processing unit 51*d* to calculate a state of charge of the electrolyte solutions from the measured voltage value. The fourth processing unit 51*d* directly obtains a state of charge corresponding to the measured voltage value, with reference to the above-described relationship between the monitor cell voltage and the state of charge (SOC) stored in the memory. The state-of-charge value calculated by the fourth processing unit 51*d* from the measured voltage value is referred to as a second state-of-charge value.

When the flow rates of the pumps 24 and 34 are changed by the pump controlling unit 53, the time constant changes as well. Accordingly, the computing unit 51 preferably changes the time constant according to the flow rates of the pumps 24 and 34. The time constant that conforms to the flow rates of the pumps 24 and 34 may be obtained by performing measurement in advance while operating the RF battery system 1 while changing the flow rates of the pumps 24 and 34, and stored in a memory of the battery management system 50. If the time constant is changed according to the flow rates of the pumps 24 and 34, a proper corrected voltage value that conforms to the time delay in the monitor cell voltage can be obtained. Thus, the first state-of-charge value can be optimized.

Furthermore, the RF battery system 1 of Embodiment 1 includes a logging unit 54, a first determining unit 55, and a second determining unit 56. The logging unit 54, the first determining unit 55, and the second determining unit 56 are provided in the battery management system 50.

Logging Unit

The logging unit 54 records the first state-of-charge value calculated by the computing unit 51 (the third processing unit 51*c*) at constant time intervals in a memory. The first state-of-charge value recorded by the logging unit 54 can be effectively used, for example, for operation analysis and the like of the RF battery system 1.

First Determining Unit

The first determining unit 55 determines whether or not the first state-of-charge value is within a predetermined range, and emits an abnormality signal upon determining that the value is not within the predetermined range. Examples of the predetermined range include the usable state-of-charge range. If the first determining unit 55 emits an abnormality signal in the case in which the first state-of-charge value is not within the predetermined range, it is possible to give notice of an abnormality in the state of charge of the electrolyte solutions. For example, if the battery management system 50 receives an abnormality signal, the battery management system 50 can stop charging or discharging of the cells 10, or alert an operator by displaying warning on a display screen, lighting a lamp, sounding a buzzer, or the like.

Second Determining Unit

The second determining unit 56 determines whether or not the second state-of-charge value calculated by the computing unit 51 (the fourth processing unit 51*d*) is within a predetermined range, and emits an abnormality signal upon determining that the value is not within the predetermined range. If the second determining unit 56 emits an abnormality signal in the case in which the second state-of-charge value is not within the predetermined range, it is possible to protect the cells 10 from damage due to overcharge or overdischarge, by the battery management system 50 stopping charging or discharging of the cells 10. Furthermore, it is also possible to alert an operator by displaying warning on a display screen, lighting a lamp, or sounding a buzzer, for example, in response to the abnormality signal.

Effects of Embodiment

The above-described RF battery system 1 of Embodiment 1 has the following actions and effects.

The RF battery system 1 includes the computing unit 51, and causes the first processing unit 51*a*, the second processing unit 51*b*, and the third processing unit 51*c* to calculate a state of charge (a first state-of-charge value) of the electrolyte solutions from a corrected voltage value, and thus it is possible to see the state of charge of the electrolyte solutions in the entire system in real-time. Furthermore, the computing unit 51 further includes the fourth processing unit 51*d*, and the RF battery system 1 causes the fourth processing unit 51*d* to calculate a state of charge (a second state-of-charge value) of the electrolyte solutions from a measured voltage value, and thus it is possible to see, in real-time, the state of charge of the electrolyte solutions that are supplied to the cells 10.

MODIFIED EXAMPLE 1

In Embodiment 1, the case was described in which the battery management system 50 includes the computing unit 51, but there is no limitation to this. For example, it is also possible to adopt a configuration in which the computing unit 51 is provided in the power conditioning system 40.

MODIFIED EXAMPLE 2

Figure 5:
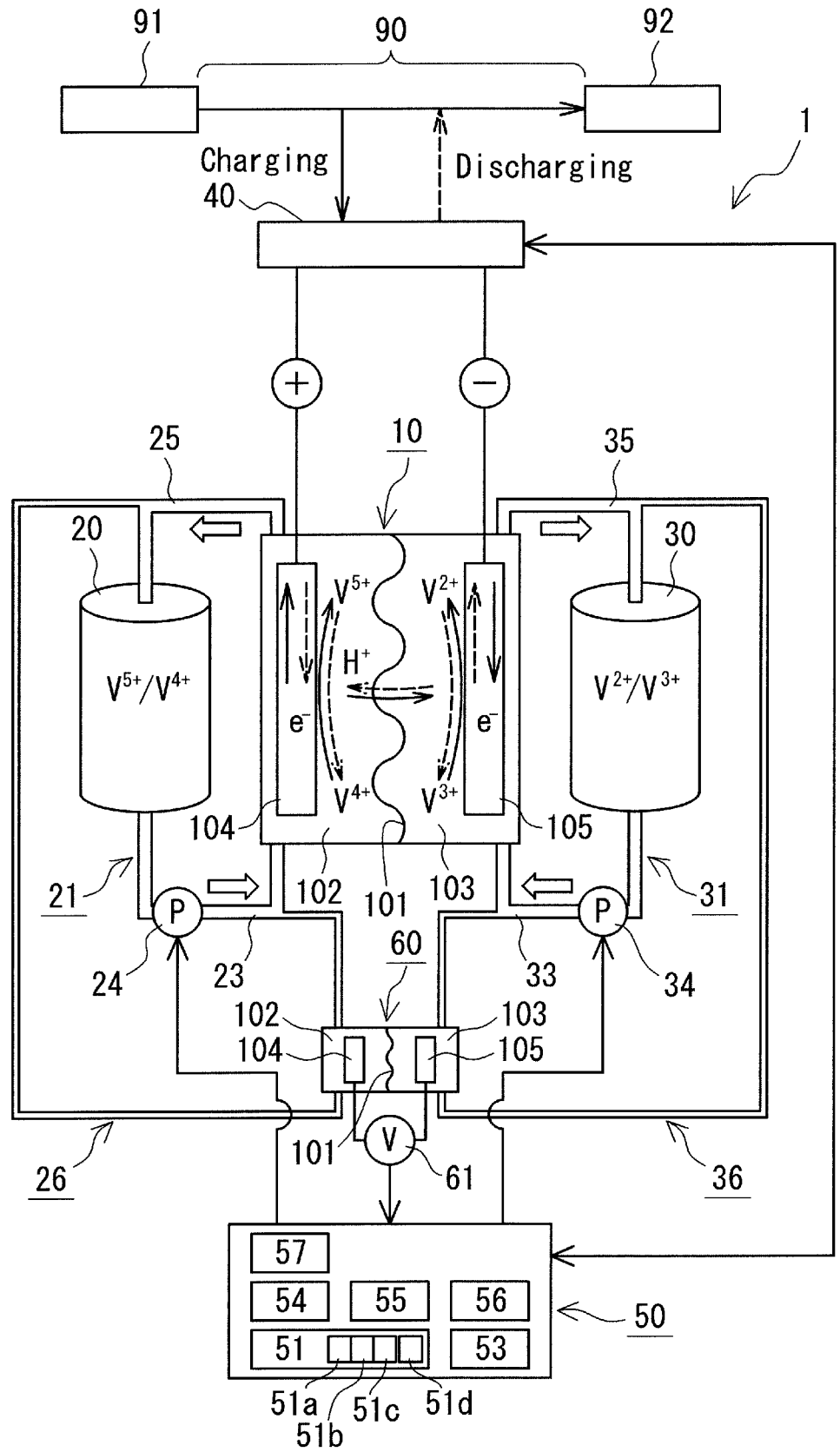
FIG. 5 is a schematic configuration diagram of a redox flow battery system according to Modified Example 2.

In Embodiment 1, the configuration was described in which an ammeter that directly measures a current that is input to and output from the cells 10 is used as the current measuring unit 71, but there is no limitation to this. It is also possible that a current that is input to and output from the cells 10 can be calculated, for example, based on a current that flows through the power conditioning system 40. Hereinafter, in Modified Example 2, a configuration in which a current calculating unit 57 is provided as a current measuring unit will be described with reference to FIG. 5. The current calculating unit 57 calculates a current that is input to and output from the cells 10, from the alternating current value measured by the power conditioning system 40, the conversion efficiency of the power conditioning system 40, and the resistance of the cells 10. The RF battery system 1 of Modified Example 2 shown in FIG. 5 is different from Embodiment 1 shown in FIG. 1 in that the battery management system 50 includes the current calculating unit 57 instead of the ammeter. Furthermore, in Modified Example 2, the alternating current value measured by the power conditioning system 40 is transmitted to the battery management system 50.

If the current calculating unit 57 is provided, the current that is input to and output from the cells 10 can be calculated by the current calculating unit 57. Accordingly, this configuration is effective for the case in which it is difficult to attach an ammeter, and to directly measure a current that is input to and output from the cells 10. Furthermore, in this case, it is preferable that the resistance of the cells 10, for use by the current calculating unit 57, is changed according to the temperature of the electrolyte solutions, and the conversion efficiency of the power conditioning system 40 is changed according to the operation output of the power conditioning system 40. The resistance of the cells 10 changes in accordance with the temperature of the electrolyte solutions. Accordingly, if the resistance of the cells 10, for use by the current calculating unit 57, is changed according to the temperature of the electrolyte solutions, it is possible to precisely calculate the current that is input to and output from the cells 10. Meanwhile, the conversion efficiency of the power conditioning system 40 changes in accordance with the operation output. Accordingly, if the conversion efficiency of the power conditioning system 40, for use by the current calculating unit 57, is changed according to the operation output, it is possible to precisely calculate the current that is input to and output from the cells 10. The resistance of the cells 10 that conforms to the temperature of the electrolyte solutions and the conversion efficiency that conforms to the operation output of the power conditioning system 40 may be obtained by performing measurement in advance through an experiment, and stored in a memory of the battery management system 50. It is also possible to adopt a configuration in which the current calculating unit 57 is provided in the power conditioning system 40.

Test Example 1

Figure 6:
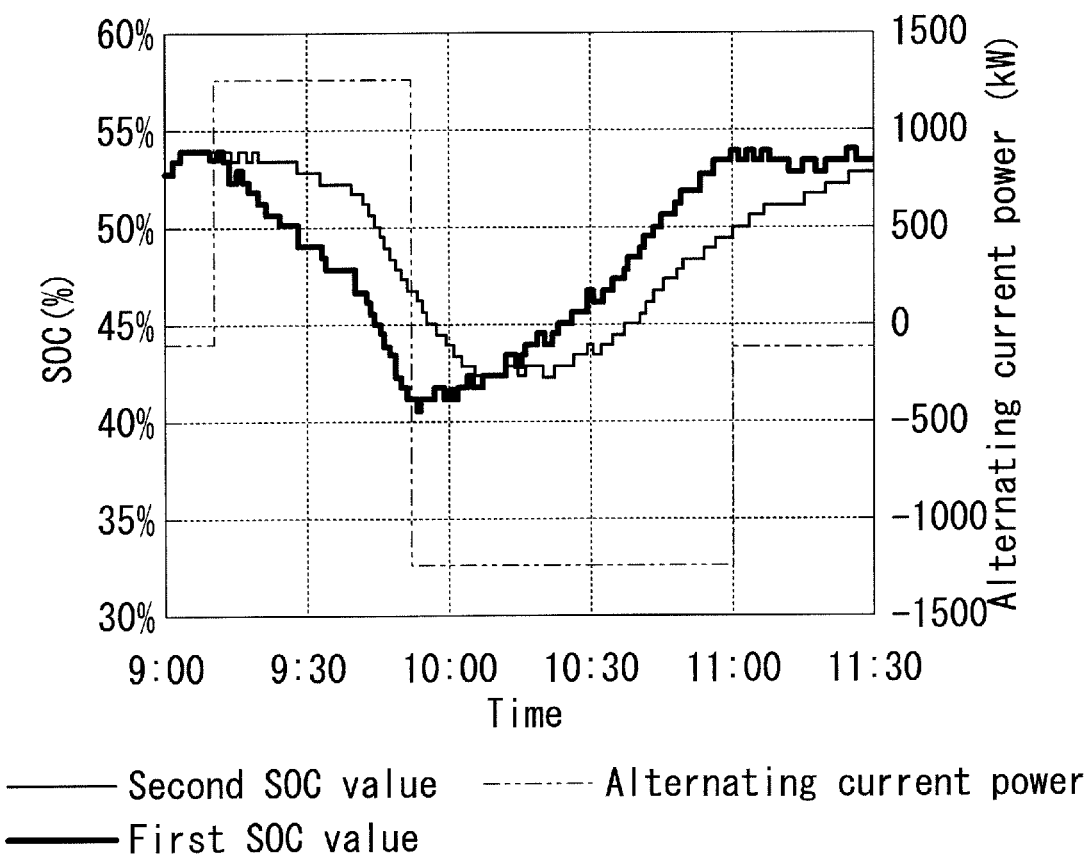
FIG. 6 is a graph showing the state of charge (SOC) of an electrolyte solution obtained by a computing unit when a redox flow battery system of Test Example 1 was operated.

An RF battery system with a configuration that is similar to that in Embodiment 1 above was investigated in terms of values of the state of charge of the electrolyte solutions obtained by the computing unit 51 while a charging and discharging operation was actually being performed. FIG. 6 shows the result. FIG. 6 shows, in comparison, a first state-of-charge value (a first SOC value) calculated by the computing unit 51 (the third processing unit 51c) from the corrected voltage value when the RF battery system was operated, and a second state-of-charge value (a second SOC value) calculated by the computing unit 51 (the fourth processing unit 51d) from the measured voltage value when the RF battery system was operated. In FIG. 6, the horizontal axis indicates the time. In FIG. 6, the left vertical axis indicates the state of charge (SOC), and the right vertical axis indicates the alternating current power. In FIG. 6, the thin solid line indicates the second SOC value, and the thick solid line indicates the first SOC value. In FIG. 6, the two-dot chain line indicates the alternating current power.

In the RF battery system of Test Example 1, parameters that were used by the computing unit were set as follows.

Time constant (τ): 1200 seconds
Number of cells (n): 96 cells
Maximum value ($E_{max}$) of monitor cell voltage: 1.48 V
Minimum value ($E_{min}$) of monitor cell voltage: 1.30 V
Maximum value ($SOC_{max}$) of usable state-of-charge range: 74.8%
Minimum value ($SOC_{min}$) of usable state-of-charge range: 16.4%
Molar concentration (V) of vanadium ions: 1.7 mol/L
Amount (L) of electrolyte solution: 40m$^3$
Faraday constant (F): 96485 C/mol The proportional constant K was obtained as in Equation 4 below, by substituting the above-described values for Equation 2.

$$K = \frac{1.48\ V - 1.30\ V}{Ah \times (74.8\% - 16.4\%)} \approx 1.58 \times 10^{-7} \qquad \text{Equation 4}$$

It is seen from the result shown in FIG. 6 that the second SOC value indicated by the thin solid line changed so as to decrease after a certain period of time has elapsed after discharging is started, at the time of discharging, and so as to increase after a certain period of time has elapsed after charging is started, at the time of charging, that is, there was a time delay from charging or discharging. Furthermore, after 11:00 at which the charging was stopped, the SOC gradually increased due to the influence of the time delay. Meanwhile, it is seen that the first SOC value indicated by the thick solid line changed so as to decrease immediately after discharging is started, at the time of discharging, and so as to increase immediately after charging is started, at the time of charging, that is, there was barely any time delay from charging or discharging. Furthermore, after 11:00 at which the charging was stopped, the SOC did not substantially change, and was constant. It is seen from this result that it is possible to see the state of charge of the electrolyte solutions in the entire system in real-time, by causing the computing unit to calculate a first state-of-charge value (a first SOC value) from the corrected voltage value.

Note below will be disclosed regarding the foregoing embodiment of the present disclosure.

Note 1

A method for calculating a state of charge of an electrolyte solution in a redox flow battery system including a cell that performs charging and discharging through the supply of the electrolyte solution, and a monitor cell to which an electrolyte solution that is the same as the electrolyte solution is supplied, comprising:

a first step of measuring a current that is input to and output from the cell;

a second step of measuring an open circuit voltage of the monitor cell; and a third step of computing a state of charge of the electrolyte solution, wherein the third step includes:

a first processing that computes an integral value obtained by integrating a current value measured in the first step, for an amount of time corresponding to a predetermined time constant;

a second processing that computes a corrected voltage value based on a measured voltage value measured in the second step and the integral value; and a third processing that calculates a first state-of-charge value of the electrolyte solution from the corrected voltage value.

The method for calculating a state of charge of an electrolyte solution according to Note 1 above includes a third step that computes a state of charge (SOC), wherein a current value measured in the first step is integrated with a time constant, and a measured voltage value measured in the second step is corrected based on the integral value of the current. Accordingly, it is possible to correct the time delay in the monitor cell voltage from charging or discharging. Furthermore, it is possible to see the state of charge of the electrolyte solution in the entire system in real-time, by calculating a state of charge (a first state-of-charge value) of the electrolyte solution from the corrected voltage value computed based on the measured voltage value and the integral value.

LIST OF REFERENCE NUMERALS

1 RF battery system
10 Cell (main cell)
101 Membrane
102 Positive electrode cell
103 Negative electrode cell
104 Positive electrode
105 Negative electrode
100 Cell stack
13 Cell frame
131 Bipolar plate
132 Frame member
133, 134 Supply manifold
135, 136 Discharge manifold 133s, 134s Supply slit
135s, 136s Discharge slit
200 Sub stack
210 Supply/discharge plate
220 End plate
230 Tightening mechanism
20 Tank (positive electrolyte solution tank)
21 Circulation path (positive electrode circulation path)
30 Tank (negative electrolyte solution tank)
31 Circulation path (negative electrode circulation path)
23, 33 Supply pipe
24, 34 Pump
25, 35 Discharge pipe
26, 36 Branch path
40 Power conditioning system (PCS)
50 Battery management system (BMS)
51 Computing unit
51a First processing unit
51b Second processing unit
51c Third processing unit
51d Fourth processing unit
53 Pump controlling unit
54 Logging unit
55 First determining unit
56 Second determining unit
57 Current calculating unit
60 Monitor cell
61 Voltage measuring unit
71 Current measuring unit
90 Power grid
91 Power generating unit
92 Load

The invention claimed is:

1. A redox flow battery system comprising:
a cell that performs charging and discharging through supply of an electrolyte solution;
a monitor cell to which the electrolyte solution is supplied;
an ammeter that measures a current that is input to and output from the cell;
a voltmeter that measures an open circuit voltage of the monitor cell; and
a processor that computes a state of charge of the electrolyte solution,
wherein the processor includes a first processing unit, a second processing unit, and a third processing unit,
the first processing unit computes an integral value obtained by integrating a current value measured by the ammeter, for an amount of time corresponding to a predetermined time constant,
the second processing unit computes a corrected voltage value based on an open circuit voltage value measured by the voltmeter and the integral value, and
the third processing unit calculates a first state-of-charge value of the electrolyte solution from the corrected voltage value.

2. The redox flow battery system according to claim 1, wherein the time constant is obtained by performing measurement in advance while operating the redox flow battery system.

3. The redox flow battery system according to claim 1, further comprising:
a circulation path through which the electrolyte solution circulates between a tank that stores the electrolyte solution and the cell;
a pump that is provided on the circulation path, and pumps the electrolyte solution; and
a pump controlling unit that controls a flow rate of the pump, wherein the time constant is changed according to the flow rate of the pump, and
the pump controlling unit is performed by the processor.

4. The redox flow battery system according to claim 1, further comprising:
a logging unit that records the first state-of-charge value at constant time intervals, wherein the logging unit is performed by the processor.

5. The redox flow battery system according to claim 1, further comprising:
a first determining unit that determines whether or not the first state-of-charge value is within a predetermined range, and emits an abnormality signal upon determining that the value is not within the predetermined range, wherein the first determining unit is performed by the processor.

6. The redox flow battery system according to claim 1, wherein the processor includes a fourth processing unit that calculates a second state-of-charge value of the electrolyte solution from the open circuit voltage value measured by the voltmeter,
the redox flow battery system further comprises a second determining unit that determines whether or not the second state-of-charge value is within a predetermined range, and emits an abnormality signal upon determining that the value is not within the predetermined range, and
the second determining unit is performed by the processor.

7. A redox flow battery system comprising:
a cell that performs charging and discharging through supply of an electrolyte solution;
a monitor cell to which the electrolyte solution is supplied;
a voltmeter that measures an open circuit voltage of the monitor cell; and
a processor that computes a state of charge of the electrolyte solution,
wherein the processor includes a current measuring unit, a first processing unit, a second processing unit, and a third processing unit,
the current measuring unit measures a current that is input to and output from the cell,
the first processing unit computes an integral value obtained by integrating a current value measured by the current measuring unit, for an amount of time corresponding to a predetermined time constant,
the second processing unit computes a corrected voltage value based on an open circuit voltage value measured by the voltmeter and the integral value, and
the third processing unit calculates a first state-of-charge value of the electrolyte solution from the corrected voltage value.

8. The redox flow battery system according to claim 7, wherein the time constant is obtained by performing measurement in advance while operating the redox flow battery system.

9. The redox flow battery system according to claim 7, further comprising:
a circulation path through which the electrolyte solution circulates between a tank that stores the electrolyte solution and the cell;
a pump that is provided on the circulation path, and pumps the electrolyte solution; and
a pump controlling unit that controls a flow rate of the pump, wherein the time constant is changed according to the flow rate of the pump, and the pump controlling unit is performed by the processor.

10. The redox flow battery system according to claim 7, further comprising:

a logging unit that records the first state-of-charge value at constant time intervals, wherein the logging unit is performed by the processor.

11. The redox flow battery system according to claim 7, further comprising:

a first determining unit that determines whether or not the first state-of-charge value is within a predetermined range, and emits an abnormality signal upon determining that the value is not within the predetermined range, wherein the first determining unit is performed by the processor.

12. The redox flow battery system according to claim 7, wherein the processor includes a fourth processing unit that calculates a second state-of-charge value of the electrolyte solution from the open circuit voltage value measured by the voltmeter, the redox flow battery system further comprises a second determining unit that determines whether or not the second state-of-charge value is within a predetermined range, and emits an abnormality signal upon determining that the value is not within the predetermined range, and the second determining unit is performed by the processor.

13. The redox flow battery system according to claim 7, further comprising:

a power conditioning system that is connected to the cell, wherein the current measuring unit includes a current calculating unit that calculates a current that is input to and output from the cell, from an alternating current value measured by the power conditioning system, a conversion efficiency of the power conditioning system, and a resistance of the cell.

14. The redox flow battery system according to claim 13, wherein the resistance of the cell, for use by the current calculating unit, is changed according to a temperature of the electrolyte solution.

15. The redox flow battery system according to claim 13, wherein the conversion efficiency of the power conditioning system, for use by the current calculating unit, is changed according to an operation output of the power conditioning system.

* * * * *